US012695362B2

(12) United States Patent
Lee et al.

(10) Patent No.: US 12,695,362 B2
(45) Date of Patent: Jul. 28, 2026

(54) ELECTRIC COMPRESSOR

(71) Applicant: Hanon Systems, Daejeon (KR)

(72) Inventors: Hyun Woo Lee, Daejeon (KR); Sung Taeg Oh, Daejeon (KR); Young Seop Yoon, Daejeon (KR); Je Su Yun, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 19/175,293

(22) Filed: Apr. 10, 2025

(65) Prior Publication Data

US 2025/0323482 A1    Oct. 16, 2025

(30) Foreign Application Priority Data

Apr. 12, 2024    (KR) .......................... 1020240049415

(51) Int. Cl.
H02K 11/33        (2016.01)
F16L 3/137        (2006.01)

(52) U.S. Cl.
CPC .............. H02K 11/33 (2016.01); F16L 3/137 (2013.01); F04C 2240/803 (2013.01); F04C 2240/808 (2013.01)

(58) Field of Classification Search
CPC .............. F16L 3/137; F04C 2240/803; F04C 2240/808
USPC ....................................................... 248/74.3
See application file for complete search history.

(56) References Cited

U.S. PATENT DOCUMENTS

| | | | | |
|---|---|---|---|---|
| 3,149,808 A | * | 9/1964 | Weckesser | F16L 3/233 |
| | | | | 248/74.3 |
| 4,149,298 A | * | 4/1979 | Forest | B65D 63/1072 |
| | | | | 248/74.3 |
| 4,447,934 A | * | 5/1984 | Anscher | H02G 3/30 |
| | | | | 248/74.3 |
| 7,229,052 B2 | * | 6/2007 | Takeuchi | F16B 21/088 |
| | | | | 24/17 AP |
| 7,568,665 B2 | * | 8/2009 | Corbin | H02G 3/30 |
| | | | | 248/71 |
| 8,720,832 B2 | * | 5/2014 | Negel | H02G 3/32 |
| | | | | 248/71 |

(Continued)

FOREIGN PATENT DOCUMENTS

| | | | | |
|---|---|---|---|---|
| KR | 10-1886728 B1 | 8/2018 | | |
| KR | 10-2020-0087728 A | 7/2020 | | |
| WO | WO-2025184693 A1 * | 9/2025 | ............... | H02G 3/32 |

*Primary Examiner* — Thomas Fink
(74) *Attorney, Agent, or Firm* — Shumaker, Loop & Kendrick, LLP; James D. Miller

(57) ABSTRACT

An electric compressor, including: a motor configured to generate power; a compression mechanism configured to compress a refrigerant by receiving power from the motor; an inverter configured to control the motor; a connector connected to an external device; a power terminal extending from the connecter to the inverter so as to deliver power supplied from the external device to the inverter; and an interlock wire extending from the connector to the inverter so as to deliver a signal to the inverter when the connecter is detached from the external device, and a fixing member fixed to a board of the inverter while supporting the interlock wire may be provided, thereby it is possible to prevent the interlock wire from being damaged to an extent to which the cost, the size, and the weight are not dramatically increased.

14 Claims, 10 Drawing Sheets

(56) References Cited

U.S. PATENT DOCUMENTS

| | | | |
|---|---|---|---|
| 2012/0300422 A1* | 11/2012 | Sun | G06F 1/183 |
| | | | 361/759 |
| 2015/0349613 A1* | 12/2015 | Hattori | F04B 35/04 |
| | | | 310/71 |
| 2023/0032339 A1* | 2/2023 | Mitteer | H02K 3/12 |
| 2025/0007365 A1* | 1/2025 | Zhang | H02K 11/33 |

* cited by examiner

ELECTRIC COMPRESSOR

CROSS REFERENCE TO RELATED APPLICATION

This patent application claims the benefit of and priority to Korean Patent Application No. KR 10-2024-0049415 filed on Apr. 12, 2024, the entire contents of which are incorporated herein by reference for all purposes.

FIELD

The present disclosure relates to an electric compressor, more particularly, to an electric compressor configured to compress a refrigerant with a driving force of a motor controlled by an inverter.

BACKGROUND

Generally, a compressor is an apparatus compressing a fluid such as a refrigerant gas and the like, and is applied to an air conditioning (A/C) system of a building, a vehicle and the like.

The compressor is classified into a reciprocating compressor that compresses a refrigerant according to which pistons reciprocate, and a rotary compressor that compresses a refrigerant while rotating. The reciprocating compressor includes a crank compressor that transmits a driving force from a drive source to a plurality of pistons using a crank, a swash plate compressor that transmits a driving force from a drive source to a shaft installed with a swash plate, and the like, according to the power transmission from the drive source. The rotary compressor includes a vane rotary compressor that utilizes a rotating rotary shaft and vane, and a scroll compressor that utilizes an orbiting scroll and a fixed scroll.

Depending on a driving method, the compressors may be classified into a mechanical compressor that uses an engine and an electric compressor that uses a motor (hereinafter, an electric compressor).

Here, the electric compressor is applied with an inverter which controls the motor for adjusting a compression capacity.

FIG. 1 is a cross-sectional view illustrating an electric compressor according to an embodiment of the prior art, and FIG. 2 is a perspective view illustrating a board and a connector of an inverter of an electric compressor in FIG. 1.

Referring to FIGS. 1 and 2, the electric compressor according to an embodiment of the prior art includes a motor 20 configured to generate power, a compression mechanism 40 configured to receive the power from the motor 20 and to compress a refrigerant, an inverter 50 configured to control the motor 20, and a connector 60 connecting the inverter 50 to an external device, and the connector 60 includes a high voltage connector 62 connected to a high voltage conduction unit so as to supply electric power to the inverter 50, and a low voltage connector 64 connected to a low voltage conduction unit 64 so as to communicate with the inverter 50.

Here, the high voltage connector 62 includes a power terminal 72 extending from the high voltage connector 62 to the inverter 50 so as to deliver the power supplied from the high voltage conduction unit to the inverter 50, and an interlock pin 74 extending from the high voltage connector 62 to the inverter 50 so as to deliver a signal when the high voltage connector 62 is separated from the high voltage conduction unit to prevent an electric shock accident, and the power terminal 72 and the interlock pin 74 are formed in the same manner. That is, each of the power terminal 72 and the interlock pin 74 is formed as a pin extending from the high voltage connector 62 to the inverter 50 in one direction.

However, in the electric compressor according to the embodiment of the prior art, there is a problem in that insulation breakdown occurs and the assembling efficiency deteriorates because both the power terminal 72 and the interlock pin 74 are formed as pins. That is, both the power terminal 72 and the interlock pin 74 are formed as pins which extend in one direction, the interlock pin 74 is disposed to be close to the power terminal 72, and therefore, a coating is not provided because of the characteristic of a pin, and the insulation breakdown between the power terminal 72 and the interlock pin 74 occurs. In addition, an allowable current magnitude required for the interlock wire 74 is small, and an outer diameter of the interlock pin 74 and a socket 56 of the inverter 50 accommodating the interlock pin 74 is formed small, and therefore, there is a difficulty in the assembly between the interlock pin 74 and the inverter 50.

Meanwhile, FIG. 3 is a perspective view illustrating a board and a connector of an inverter of an electric compressor according to another embodiment of the prior art.

Referring to FIG. 3, a high voltage connector 62 of the electric compressor according to another embodiment of the prior art includes a power terminal 72' and an interlock wire 74', the power terminal 72' and the interlock wire 74' both are formed as wires extending bendably from the high voltage connector 62 to the inverter 50, penetrate a board 52' of the inverter 50, and are fastened to the board 52' by a fastening member such as a bolt and the like.

In this case, the insulation breakdown between the power terminal 72' and the interlock wire 74' is suppressed because a gap between the power terminal 72' and the interlock wire 74' occurs and a coating 74c' is provided, however, deterioration of the assembling efficiency is not resolved. That is, compared to the embodiments of the prior art illustrated in FIGS. 1 and 2, the assembling efficiency between interlock wire 74' and the inverter 50 is improved, however, the assembling efficiency between the power terminal 72' and the inverter 50 deteriorates.

At this instance, there is a problem in that the interlock wire 74' vibrates and is damaged by a surrounding structure in the electric compressor of the prior art illustrated in FIG. 3, that is, in the electric compressor of which the interlock wire 74' is formed as a wire. In addition, there is a problem in that a cost, a size, and a weight increase when providing an additional coating covering a coating of the wire of the interlock wire 74' or when increasing a space between the interlock wire 74' and the surrounding structure in order to resolve the problem.

PRIOR ART DOCUMENT

Patent Document

Korea Patent No. 10-2020-0087728
Korea Patent No. 10-1886728

SUMMARY

An object of the present disclosure is to provide an electric compressor capable of preventing damage to an interlock wire due to vibration to an extent to which the cost, the size, and the weight are not dramatically increased when the interlock wire for delivering a signal to the inverter upon disconnection of the connector from an external device is provided in the electric compressor.

One embodiment is an electric compressor, including: a motor configured to generate power; a compression mechanism configured to compress a refrigerant by receiving power from the motor; an inverter configured to control the motor; a connector connected to an external device; a power terminal extending from the connecter to the inverter so as to deliver power supplied from the external device to the inverter; and an interlock wire extending from the connector to the inverter so as to deliver a signal to the inverter when the connecter is detached from the external device, and a fixing member fixed to a board of the inverter while supporting the interlock wire may be provided The fixing member may include a support portion supporting the interlock wire and a fixing portion fixing the support portion to the board.

The fixing portion may include a hook covering an outer circumferential portion of the board.

The hook may include a hook base extending from the support portion and a hook tip portion extending from the hook base toward an opposite side of the support portion with respect to the board.

The board may include a board lower surface facing the connector, a board upper surface forming a rear surface of the board lower surface, and a board outer circumferential surface extending from an outer circumferential portion of the board lower surface to an outer circumferential portion of the board upper surface, and the support portion may be in contact with the board upper surface, the hook base may be in contact with the board outer circumferential surface, and the hook tip portion may be in contact with the board lower surface.

The hook tip portion may be formed swingable with respect to the hook base.

The hook tip portion may include a hook hole penetrated by the hook tip portion, the board may include a board hole penetrating the board, and the fixing portion may further include a protrusion penetrating the hook hole and the board hole.

The protrusion may include a protrusion base extending from the support portion and a protrusion tip portion disposed on an opposite side of the support portion with respect to the protrusion base, an outer diameter of the protrusion base may be equal to or smaller than an inner diameter of the board hole and an inner diameter of the hook hole, the protrusion tip portion may have an outer diameter decreasing away from the support portion along an extending direction of the protrusion, and a maximum outer diameter of the protrusion tip portion may be formed greater than the inner diameter of the board hole and the inner diameter of the hook hole.

The support portion may protrude from a surface connected to the interlock wire of the board and formed to cover the interlock wire.

The support portion may include a buckle having a buckle hole and a belt extending from the buckle and inserted into the buckle hole, the belt may be inserted into the buckle hole while covering the interlock wire in a state in which the interlock wire is seated on the buckle, and the interlock wire may be supported by the support portion.

The interlock wire may include a conductive wire formed of a conductive material, a first interlock connector connected to an end of the conductive wire, and a coating covering the conductive wire, a second interlock connector fastened to the first interlock connector may be mounted in the board, and the second interlock connector may be mounted in the board at a position not facing the connector.

The board may include a board lower surface facing the connector, a board upper surface forming a rear surface of the board lower surface, a board outer circumferential surface extending from an outer circumferential portion of the board lower surface to an outer circumferential portion of the board upper surface, and a board groove formed recessed on the board outer circumferential surface, the second interlock connector may be mounted on the board upper surface, and the interlock may penetrate the board through the board groove and extends from the connector to the second interlock connector.

The second interlock connector may be mounted in the outer circumferential portion of the board.

An electric compressor according to the present disclosure includes: a motor configured to generate power; a compression mechanism configured to compress a refrigerant by receiving power from the motor; an inverter configured to control the motor; a connector connected to an external device; a power terminal extending from the connecter to the inverter so as to deliver power supplied from the external device to the inverter; and an interlock wire extending from the connector to the inverter so as to deliver a signal to the inverter when the connecter is detached from the external device, and a fixing member fixed to a board of the inverter while supporting the interlock wire is provided, thereby it is possible to prevent the interlock wire from being damaged to an extent to which the cost, the size, and the weight are not dramatically increased.

DETAILED DESCRIPTION

Hereinafter, an electric compressor according to the present disclosure will be described in detail with reference to the accompanying drawings.

Figure 4:
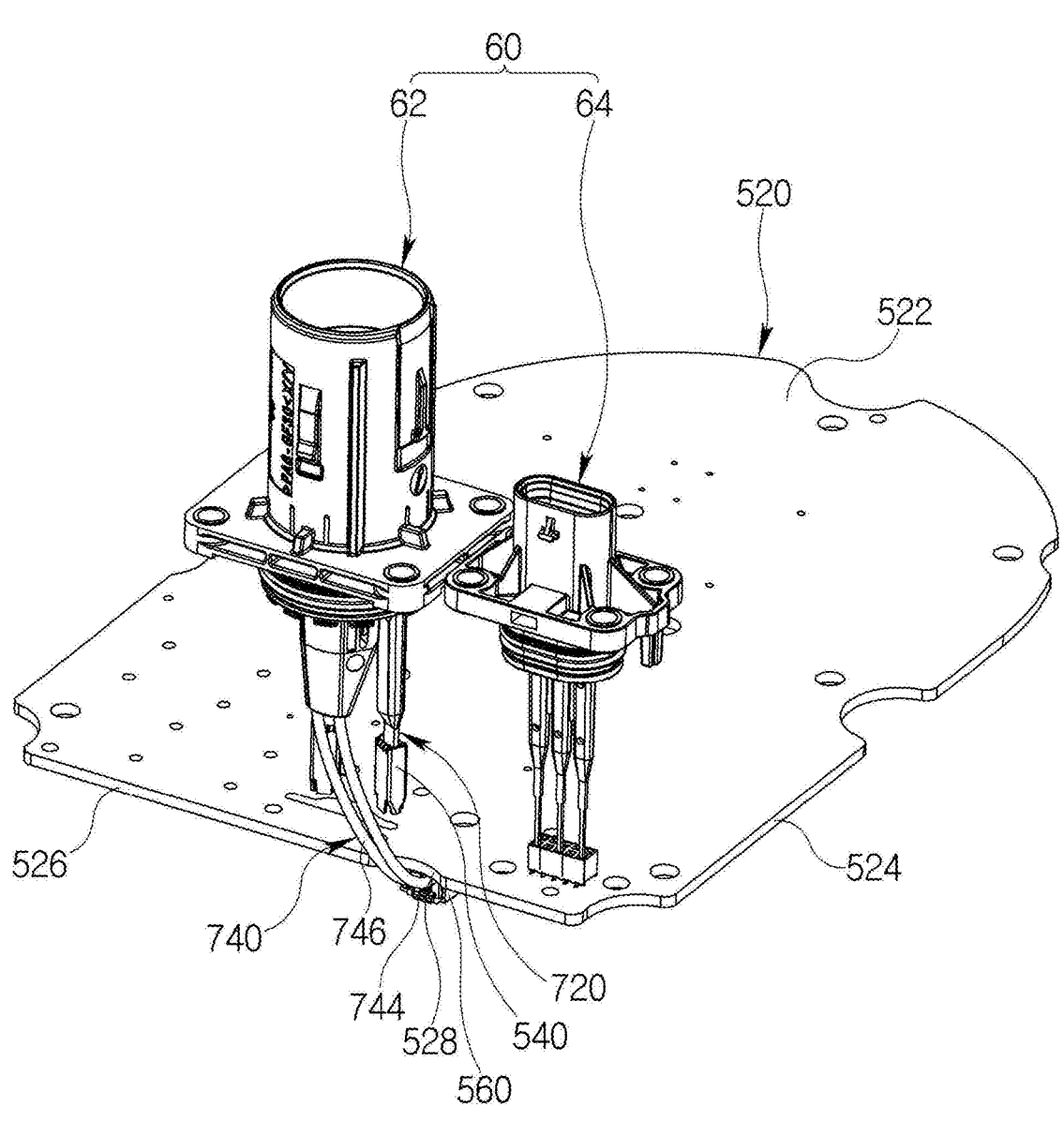
FIG. 4 is a perspective view illustrating a board of an inverter and a connector of an electric compressor according to an embodiment of the present disclosure.

FIG. 4 is a perspective view illustrating a board of an inverter and a connector of an electric compressor according to an embodiment of the present disclosure.

Figure 1:
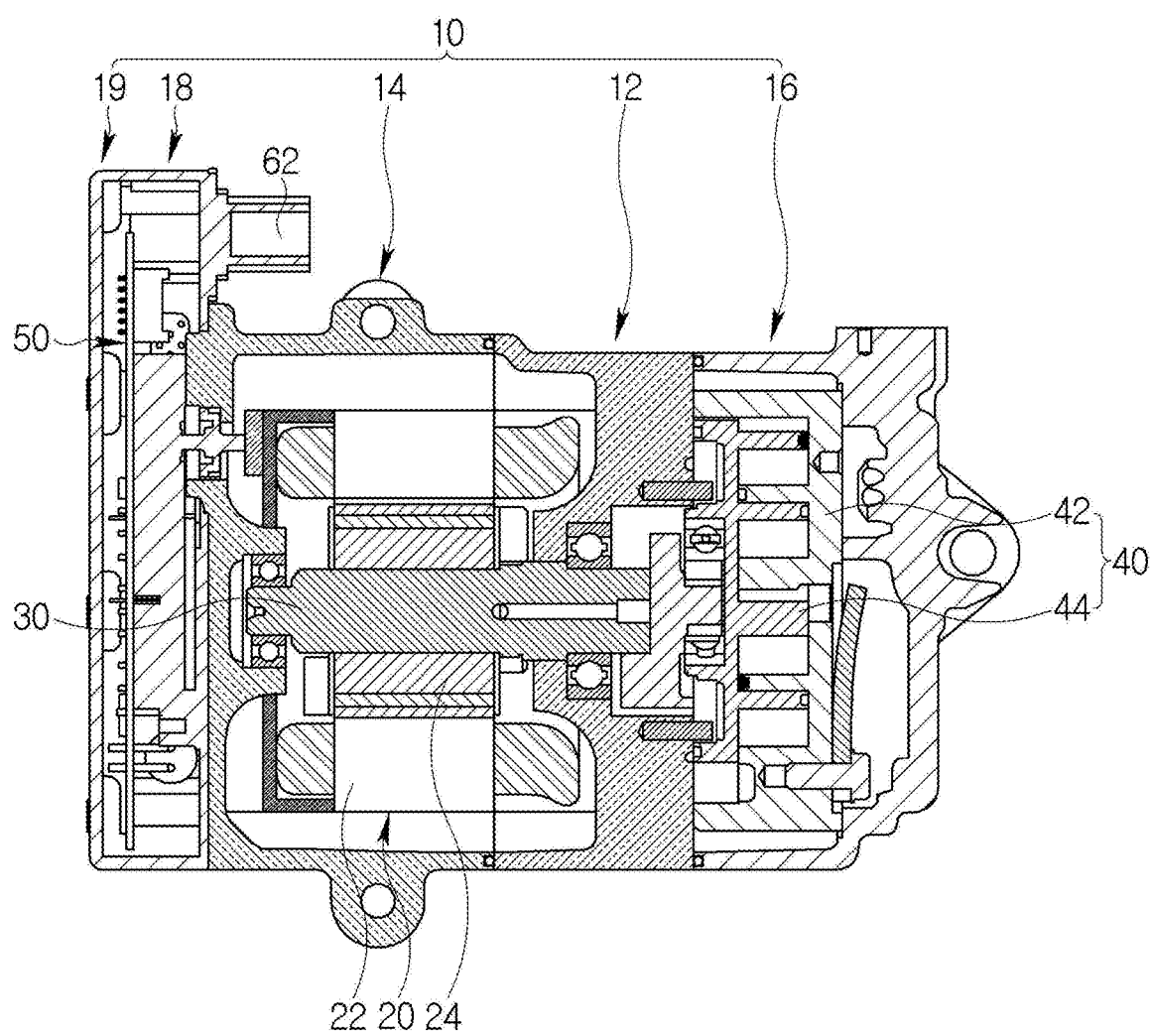
FIG. 1 is a cross-sectional view illustrating an electric compressor according to an embodiment of the prior art.
Figure 2:
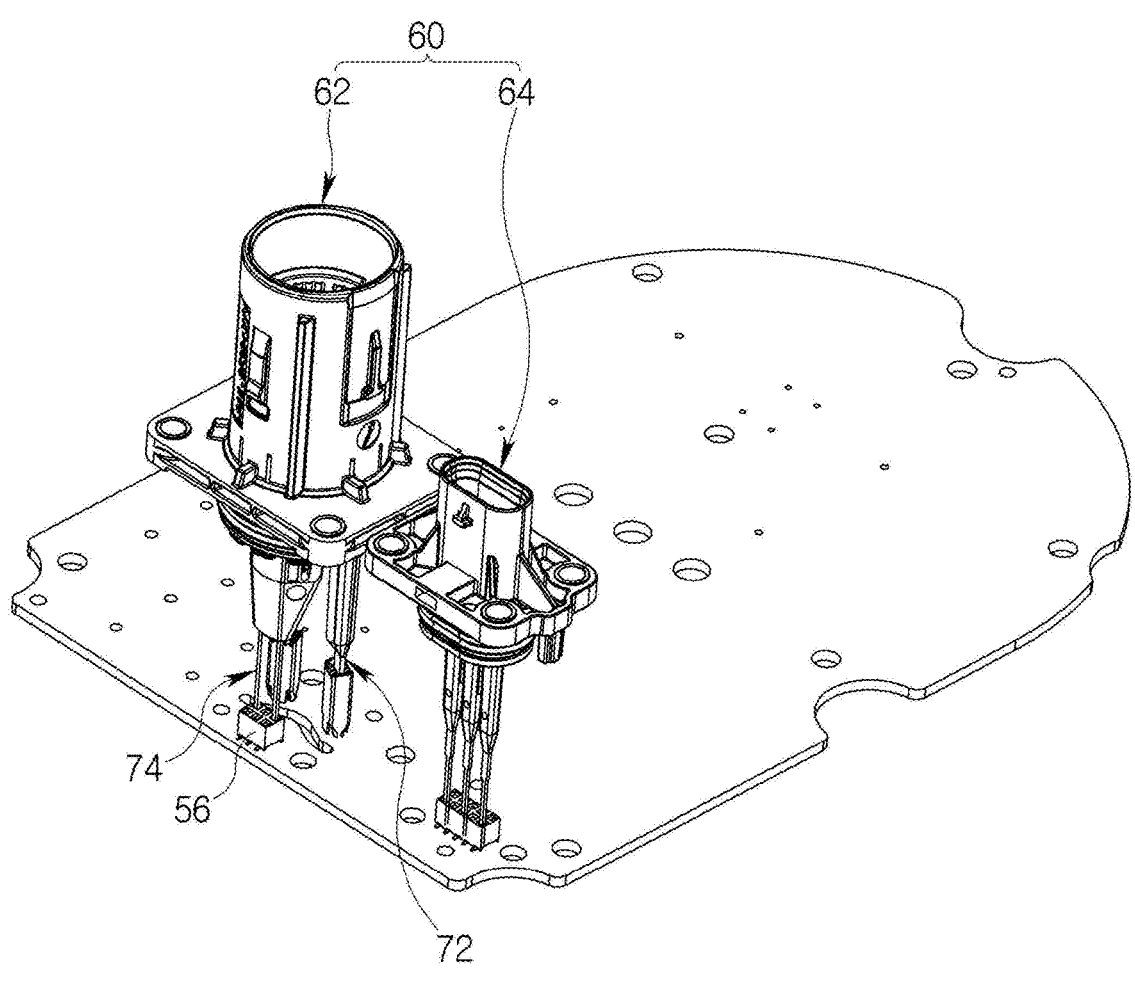
FIG. 2 is a perspective view illustrating a board and a connector of an inverter of an electric compressor in FIG. 1.
Figure 3:
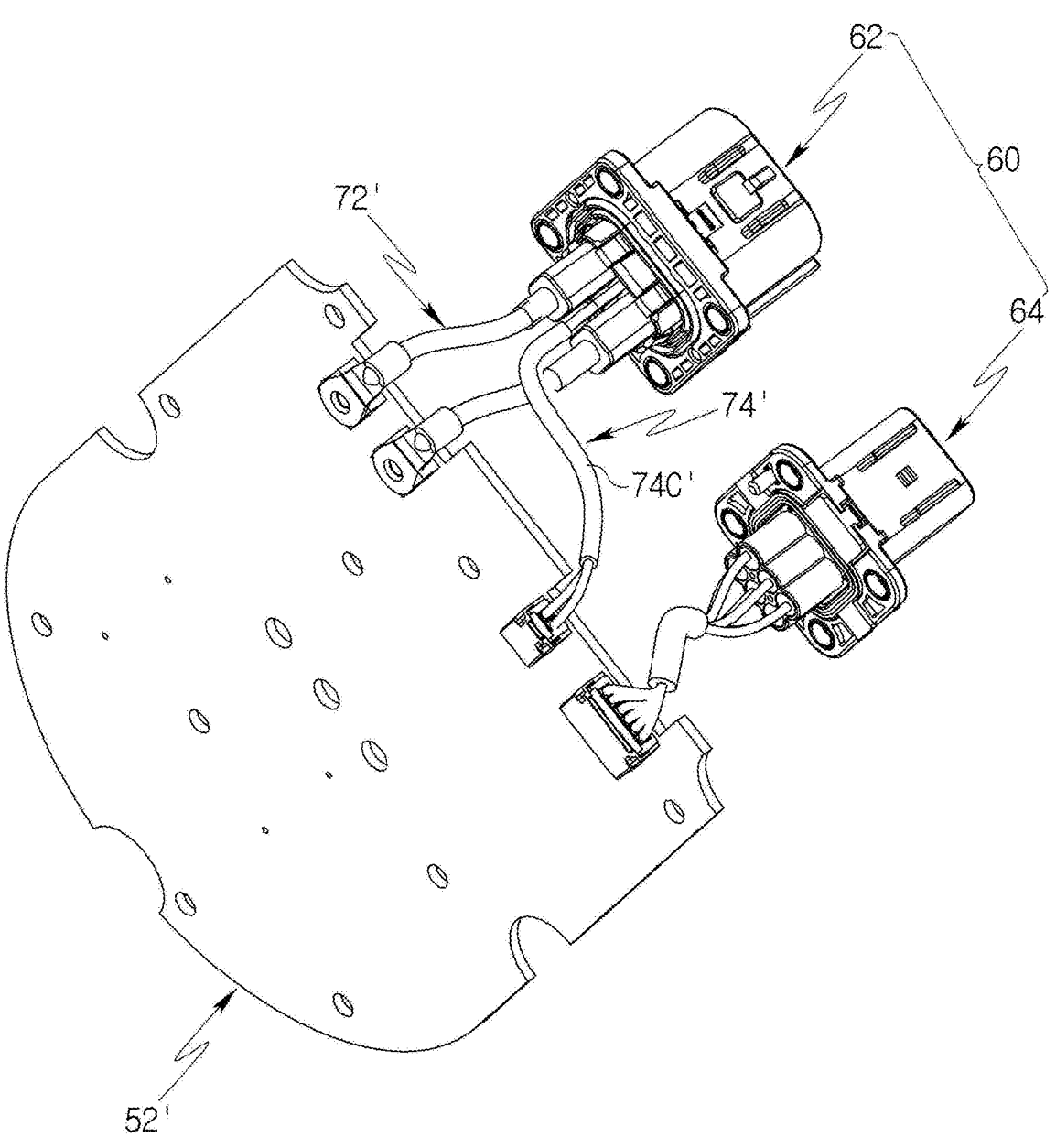
FIG. 3 is a perspective view illustrating a board and a connector of an inverter of an electric compressor according to another embodiment of the prior art.

Meanwhile, FIG. 1 will be referred for components not illustrated in FIG. 4 for convenience of description.

Referring to FIGS. 4 and 1, the electric compressor according to an embodiment of the present disclosure may include a housing 10, a compression mechanism 40 configured to compress a refrigerant inside the housing 10, a motor 20 providing power to the compression mechanism 40, an inverter configured to control the motor 20, and a connector 60 connecting the inverter 50 to an external device. Here, the external device may be a power supply on the vehicle side, and may be connected through a connector on the vehicle side.

The housing 10 may include a center housing 12, a front housing 14 coupled to the center housing 12 and forming a motor accommodating space in which the motor 20 is accommodated, an inverter housing 18 coupled to the front housing 14 on an opposite side of the center housing 12 with respect to the front housing 14 and forming an inverter accommodating space in which the inverter 50 is accommodated, an inverter cover 19 coupled to the inverter housing 18 on an opposite side of the front housing 14 with respect to the inverter housing 18 and covering the inverter accommodating space, and a rear housing 16 coupled to the center housing 12 on an opposite side of the front housing 14 with respect to the center housing 12 and forming a compression mechanism accommodating space in which the compression mechanism 40 is accommodated.

Here, the inverter housing 18 may include a connector hole exposing the connector 60 to the outside.

The compression mechanism 40 may include a fixed scroll 42 fixedly installed, an orbiting scroll 44 engaged with the fixed scroll 42 to form a compression chamber together with the fixed scroll 42 and is configured to be orbited by a drive shaft 30 configured to deliver power from the motor 20 to the compression mechanism 40.

Here, in the present embodiment, the compression mechanism 40 is formed as a scroll type, but is not limited thereto, and may be configured as other types such as a reciprocating type and a vane rotary type.

The motor 20 may include a stator 22 supported by the front housing 14, and a rotor 24 positioned inside the stator 22 and configured to be rotated by an interaction with the stator 22, and the rotor 24 may be press-inserted to the drive shaft 30.

The inverter 50 may include a printed circuit board 520 (hereinafter, a board) in which a plurality of elements are mounted.

The board 520 may include a high voltage part in which elements for operational power of the integrated circuit (IC) and the motor 20 (e.g., a micro-controller unit (MCU)), a switching element such as an insulated gate bipolar transistor (IGBT) and a metal-oxide semiconductor field-effect transistor (MOSFET) are mounted, and a low voltage part in which elements for communication with a vehicle and the like are mounted, and the elements mounted in the high voltage part and the low voltage part may be electrically connected to one another through a pattern.

Moreover, the board 520 may include a socket 540 into which a power terminal 720 which will be described below is inserted and a second interlock connector 560 fastened to a first interlock connector 744 which will be described below, and the second interlock connector 560 may be formed at a position spaced apart from the socket 540. That is, the socket 540 is mounted in the board 520 at a position facing the connector 60, and the second interlock connector 560 may be mounted in the board 520 at a position not facing the connector 60.

Here, the position not facing the connector 60 may mean a position spaced apart from the position facing the connector 60 in an extending direction of the board 520, and may mean a position of the opposite side with respect to a thickness direction of the board 520. That is, the board 520 may include a board lower surface 522 facing the connector 60 (headed toward the front housing 14), and a board upper surface 524 forming a rear surface of the board lower surface 522 (headed toward the inverter cover 19), the socket 540 may be formed at a position facing the connector 60 on the board lower surface 522, and the second interlock connector 560 may be formed at a position not overlapping the connector 60 on the board upper surface 524 in a thickness direction of the board 520. Alternatively, the second interlock connector 560 may be formed at a position not facing the connector 60 on the board lower surface 522 when the socket 540 is formed at a position facing the connector 60 on the board lower surface 522, or the second interlock connector 560 may be disposed at a position overlapping the connector 60 on the board upper surface 524 in a thickness direction of the board 520, although this is not implemented in the present embodiment. However, in terms of the insulation breakdown and assembling efficiency, it may be preferable that the socket 540 and the interlock connector 560 are formed at the same positions as the positions thereof described in the present embodiment.

Moreover, the second interlock connector 560 may be mounted in an outer circumferential portion of the board 520 on the board upper surface 524.

In addition, the board 520 may further include a board groove 528 through which an interlock wire 740 passes, and a board outer circumferential surface 526 extending from an outer circumferential portion of the board lower surface 522 to an outer circumferential portion of the board upper surface 524, and the board groove 528 may be formed recessed on the board outer circumferential surface 526.

At this instance, when the interlock wire 740 which will be described below is formed to penetrate an inside of the board 520 which is different from the present embodiment, a hole greater than the first interlock connector 744 which will be described below must be formed on the board 520 so that the first interlock connector 744 which will be described below can pass through the board 520. However, in such a case, a problem in that a size of the board 520 must increase occurs. In consideration of the above fact, in the present embodiment, the board groove 528 may be formed smaller than the first interlock connector 744 which will be described below so that the size of the board 520 does not increase, and may be formed recessed on an outer circumferential surface of the board 520 so that the interlock wire 740 which will be described below passes through the board groove 528 without the first interlock connector 744 which will be described below to pass through the board groove 528.

The connector 60 may include a high voltage connector 62 connected to the high voltage conduction unit so as to supply power to the inverter 50, and a low voltage connector 64 connected to the low voltage conduction unit for communication with the inverter 50.

Here, in the high voltage connector 62, a power terminal 720 extending from the high voltage connector 62 to the inverter 50 so as to deliver power supplied from the high voltage conduction unit to the inverter 50 is provided, and the interlock wire 740 extending from the high voltage connector 52 to the inverter 50 so as to deliver a signal to the inverter 50 when the high voltage connector 62 is disconnected from the high voltage conduction unit to prevent an electrical shock accident is provided, and the power terminal 720 and the interlock wire 740 may be formed in different manners.

In more detail, the power terminal 720 may be formed as a pin extending from the high voltage connector 62 to the board 520 in one direction.

In addition, the power terminal 720 may be automatically inserted into and fixed in the socket 540 of the board 520, when the board 520 is inserted into the inverter accommodating space and gets closer to the high voltage connector 62.

The interlock wire 740 may be formed as a wire bendably extending from the high voltage connector 62 to the board 520.

Here, the interlock wire 740 may include a conductive wire formed of a conductive material, and the first interlock connector 744 connected to an end of the conductive wire, and a coating 746 covering the conductive wire.

In addition, the interlock wire 740 may pass the board groove 528 and may be coupled to the second interlock connector 560 provided on the board upper surface 524 on which the first interlock connector 744 is also provided.

Here, to secure easy and stable removal of the first interlock connector 744 and the second interlock connector 560, one among the first interlock connector 744 and the second interlock connector 560 may be formed as a male connector and the other thereamong may be formed as a female connector.

Hereinafter, the functions and effects of the present electric compressor will be described.

That is, when power is applied to the motor 20, a low-temperature and a low-pressure refrigerant is introduced into the motor accommodating space through a suction port formed in the front housing 14, the refrigerant in the motor accommodating space is introduced into the compression mechanism 40 to be compressed to be a high-temperature and high-pressure refrigerant, and is discharged to the outside the housing 10 through a discharge chamber provided in the rear housing 16.

In addition, the cooling efficiency may be variably controlled because the motor 20 is controlled by the inverter 50.

At this instance, the inverter 50 is operated by receiving power through the power terminal 720, and the stability in power supply may be secured through the interlock wire 740. That is, when the high voltage connector 62 is separated from the high voltage conduction unit, a signal regarding the separation is transmitted to the low voltage conduction unit through the interlock wire 740, the inverter 50, and the low voltage connector 64, thereby power supply of the high voltage conduction unit can be blocked.

Here, the electric compressor according to the present embodiment has the power terminal 720 and the interlock wire 740 formed in different manners, therefore, the insulation breakdown between the power terminal 720 and the interlock wire 740 is prevented, thereby the assembly between the power terminal 720 and the inverter 50, and between the interlock wire 740 and the inverter 50 can be made easier.

In more detail, the power terminal 720 is formed as the pin extending from the high voltage connector 62 to the inverter in one direction, and the inverter 50 is formed to be automatically inserted into the socket 540 of the inverter 50 to be fixed therein when the inverter 50 is inserted into the inverter accommodating space, thereby the assembling efficiency between the power terminal 720 and the inverter 50 can be improved.

Moreover, as the interlock wire 740 is formed as the wire bendably extending from the high voltage connector 62 to the inverter 50, the power terminal 720 may be connected to the inverter 50 at a position facing the high voltage connector 62, while the interlock wire 740 may be connected to the inverter 50 at a position not facing the high voltage connector 62. That is, the interlock wire 740 may be spaced apart far as far as possible from the power terminal 720. With this configuration, the insulation between the power terminal 720 and the interlock wire 740 can be secured.

Furthermore, as the interlock wire 740 is formed as the wire having the coating 746, the insulation between the power terminal 720 and the interlock wire 740 can be secured more stably.

In addition, the interlock wire 740 and the inverter 50 are formed to be connected to and disconnected from each other by the first interlock connector 744 and the second interlock connector 560, the assembling efficiency between the interlock wire 740 and the inverter 50 can be improved.

Moreover, as the interlock wire 740 passes through the board 520 and is connected to the inverter 50 at a position not facing the high voltage connector 62, the interlock wire 740 may be formed short.

In more detail, unlike the present embodiment, when the second interlock connector 560 is mounted in the board low surface 522, the second interlock connector 560 is hidden as the board 520 is assembled into the electric compressor, therefore, the interlock wire 740 must be connected to the board 520 first, and then, the board must be assembled into the electric compressor. Therefore, in order to allow the interlock wire 740 to be connected to the board 520 in a state in which the board 520 is detached toward the inverter cover 19 out of the inverter accommodating space, the interlock wire 740 must be formed long.

On contrary, like the present embodiment, when the second interlock connector 560 is mounted on the board upper surface 524, the second interlock connector 560 is not hidden even if the board 520 is assembled into the electric compressor, and thus, the interlock wire 740 may be connected to the board 520 even after the board 520 is inserted into the inverter accommodating space and is assembled into the electric compressor. Therefore, the interlock wire 740 may be formed short.

Here, a case in which the interlock wire 740 is connected to the board 520 after the board 520 is assembled into the electric compressor even if the second interlock connector 560 is mounted on the board upper surface 524 may make the interlock wire 740 formed shorter than a case in which the board 520 is assembled into the electric compressor after the interlock wire 740 is connected to the board 520.

Further, as the second interlock connector 560 is mounted in the outer circumferential portion of the board 520 on the board upper surface 524, a distance between the board groove 528 and the second interlock connector 560 is reduced, thereby the interlock wire 740 can be formed shorter.

In addition, as the interlock wire 740 is formed short, a likelihood that the interlock wire 740 is vibrated and is damaged by the surrounding structure can be reduced.

Meanwhile, in the present embodiment, by making the interlock wire 740 be formed short, a likelihood that the interlock wire 740 is vibrated and is damaged by the surrounding structure is reduced, however, in order to further reduce the damage likelihood, a fixing member 800 fixing the interlock wire 740 to the board 520 can be provided as illustrated in FIGS. 5 to 10.

Figure 5:
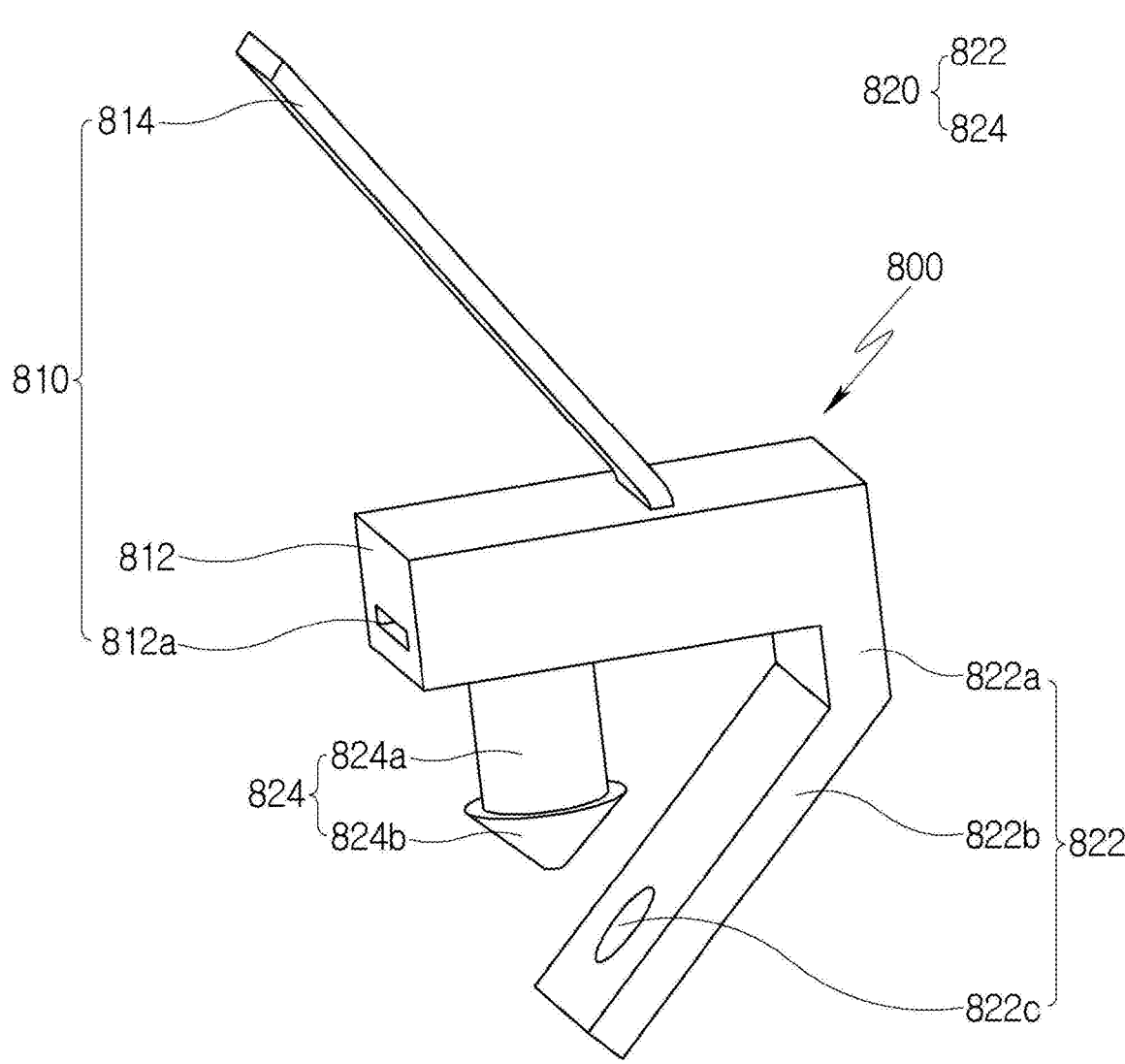
FIG. 5 is a perspective view illustrating a fixing member for fixing an interlock wire in an electric compressor according to another embodiment of the present disclosure.
Figure 6:
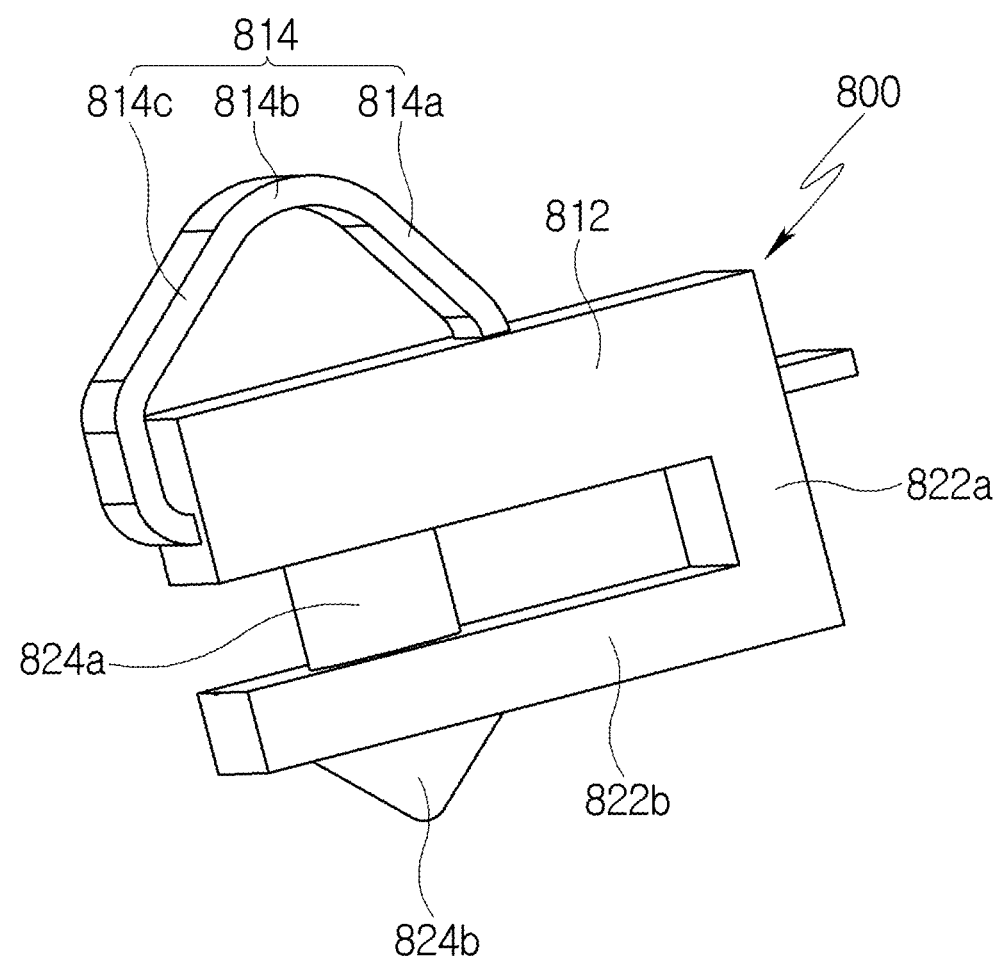
FIG. 6 is a perspective view illustrating a fixing member in FIG. 5 in a state in which the fixing member is deformed to be fixed to a board and to support an interlock wire.
Figure 7:
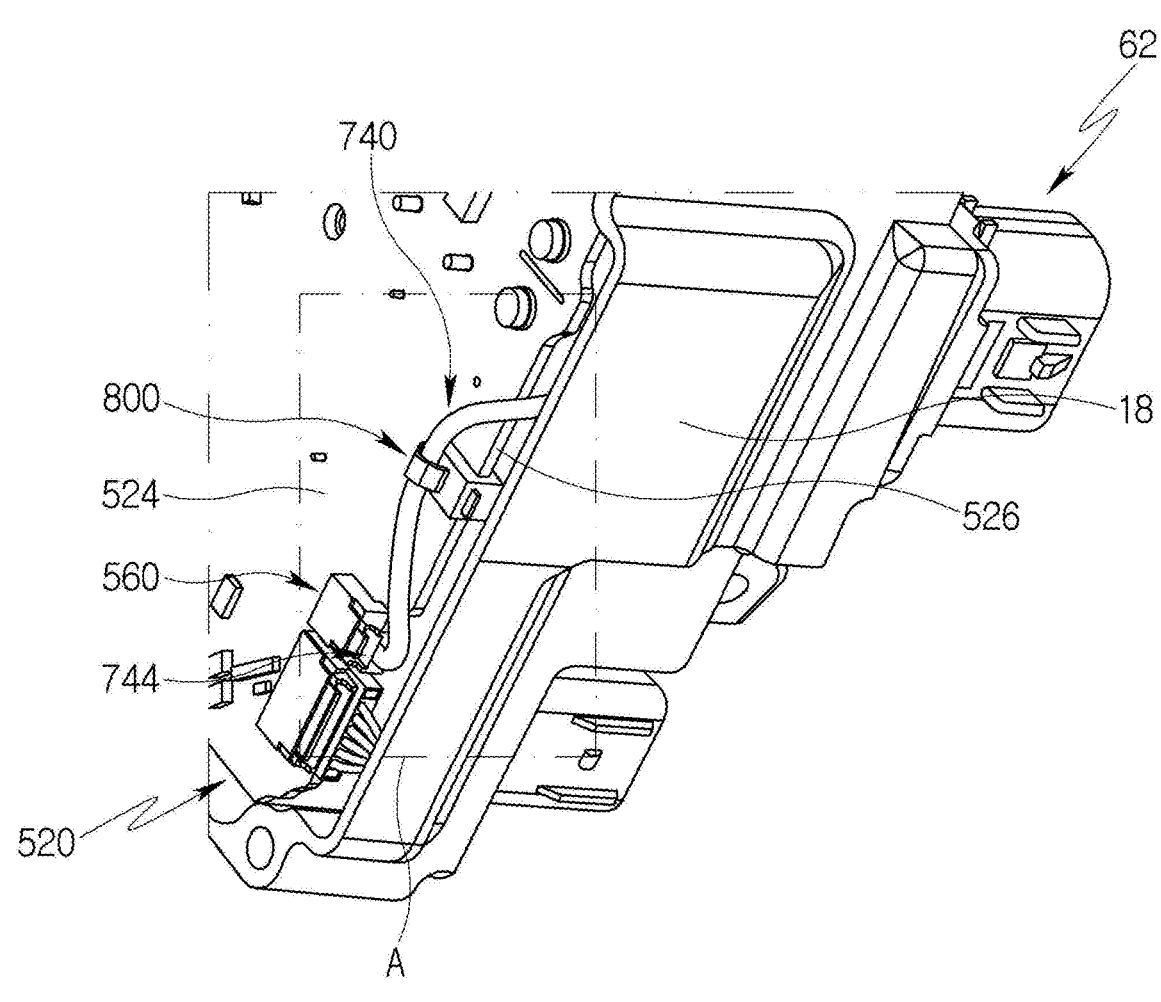
FIG. 7 is a perspective view illustrating a state in which an interlock wire is fixed to a board by a fixing member in FIGS. 5 and 6.
Figure 8:
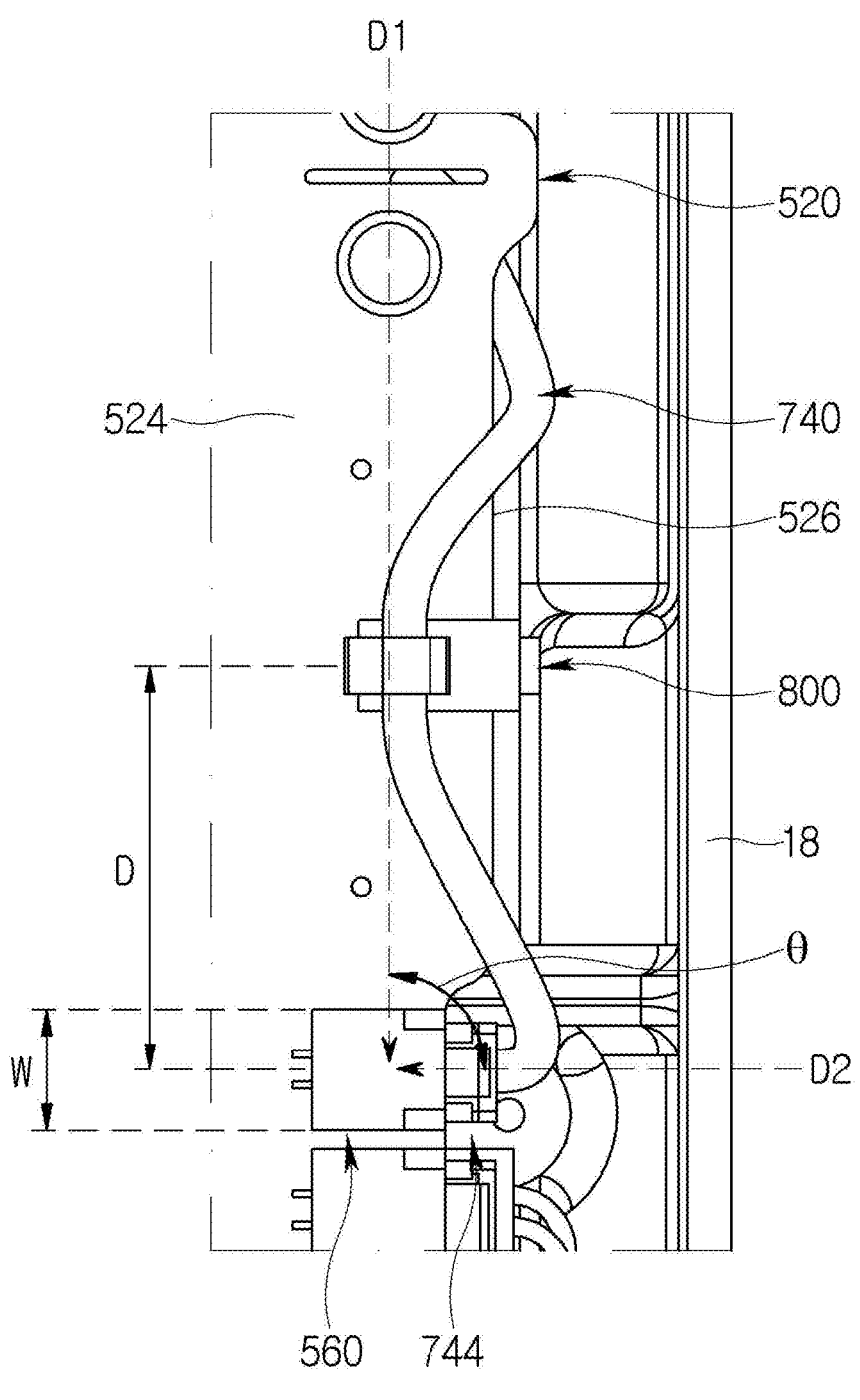
FIG. 8 is front view illustrating A part in FIG. 7.
Figure 9:
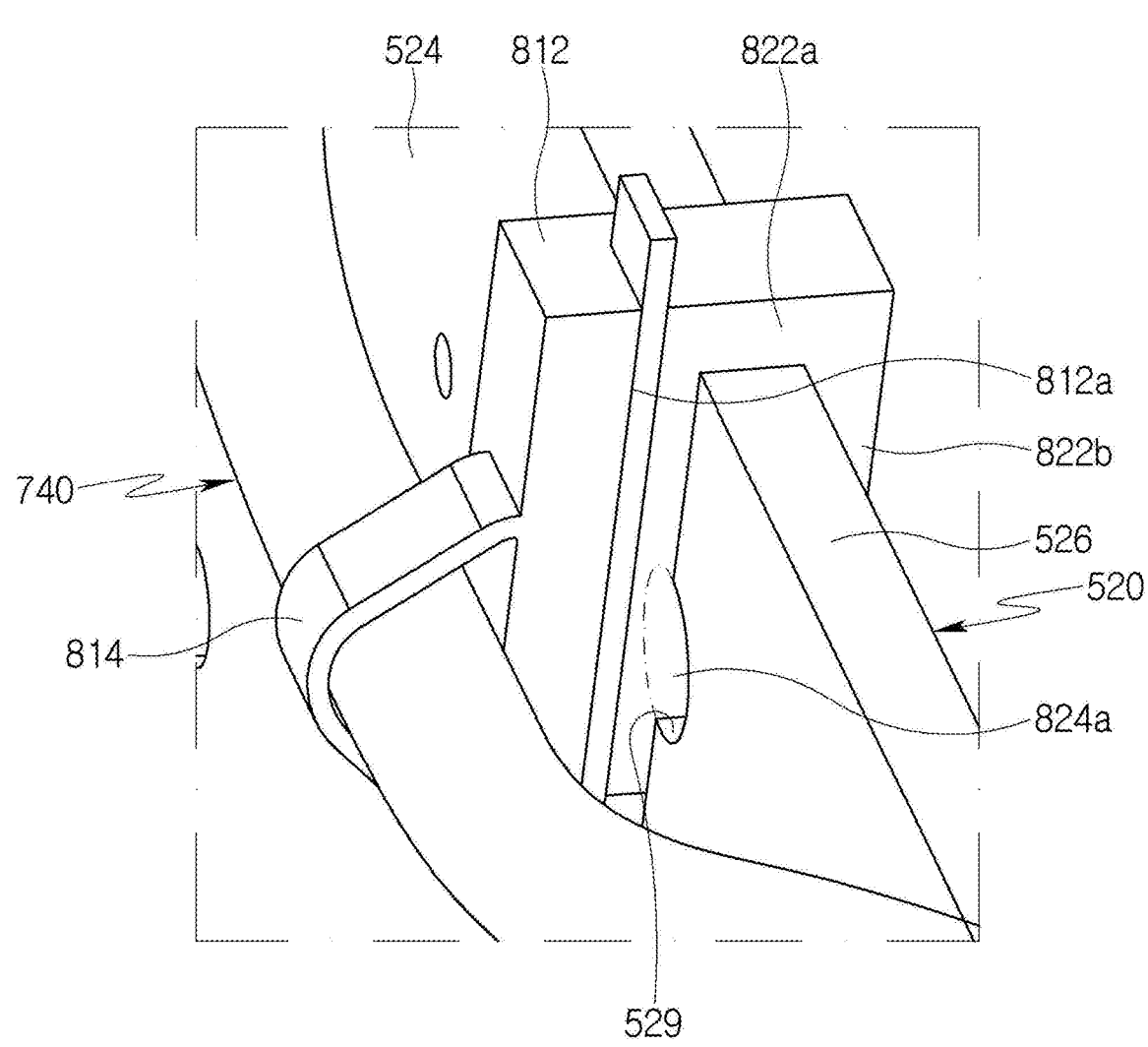
FIG. 9 is an enlarged perspective view of A part in FIG. 7 in a state in which a fixing member is cut.
Figure 10:
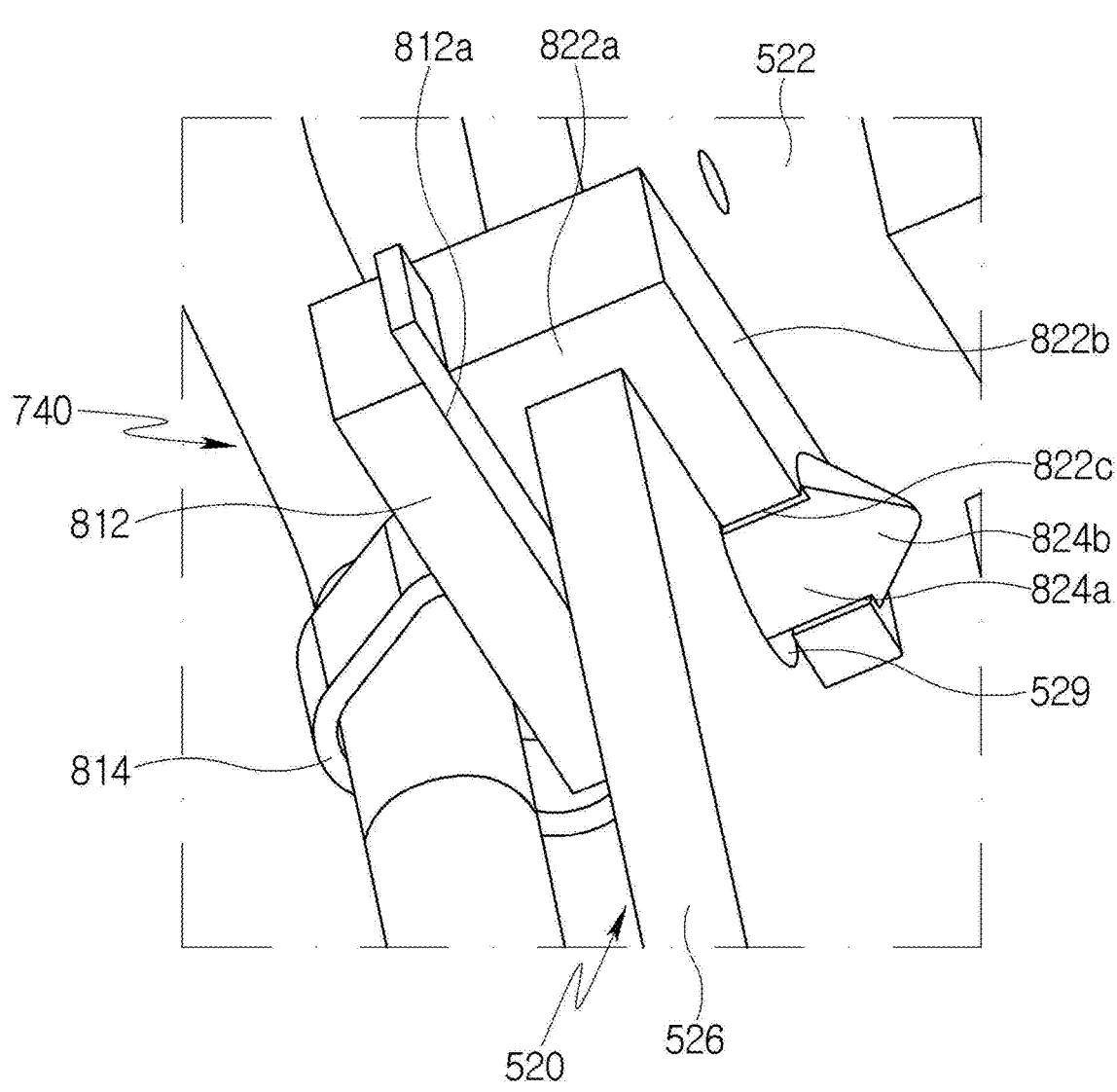
FIG. 10 is a perspective view illustrating a rear surface of FIG. 9.

FIG. 5 is a perspective view illustrating a fixing member for fixing an interlock wire in an electric compressor according to another embodiment of the present disclosure, FIG. 6 is a perspective view illustrating a fixing member in FIG. 5 in a state in which the fixing member is deformed to be fixed to a board and to support an interlock wire, FIG. 7 is a perspective view illustrating a state in which an interlock wire is fixed to a board by a fixing member in FIGS. 5 and 6, FIG. 8 is front view illustrating A part in FIG. 7, FIG. 9 is an enlarged perspective view of A part in FIG. 7 in a state in which a fixing member is cut, and FIG. 10 is a perspective view illustrating a rear surface of FIG. 9.

Referring to FIGS. 5 to 10, an electric compressor according to another embodiment of the present disclosure may include the fixing member 800 fixed to the board 520 while supporting the interlock wire 740.

In more detail, the fixing member 800 may include a support portion 810 supporting the interlock wire 740, and a fixing portion 820 fixing the support portion 810 to the board 520.

The support portion 810 may include a buckle 812 having a buckle hole 812a, and a belt 814 extending from the buckle 812 and inserted into the buckle hole 812a.

Here, though not illustrated, the buckle 812 may further include a buckle pin protruding from an inner circumferential surface of the buckle hole 812a so that the belt 814 cannot be detached after insertion into the buckle hole 812a, and the belt 814 may include a belt groove into which the buckle pin is inserted.

The fixing portion 820 may include a hook 822 covering the outer circumferential portion of the board 520.

The hook 822 may include a hook base 822a extending from one side of the supporting portion 810, and a hook tip portion 822b extending toward an opposite side of the supporting portion 810 from the hook base 822a with respect to the board 520.

Moreover, the hook tip portion 822b includes a hook hole 822c being penetrated by the hook tip portion, the board 520 includes a board hole 529 penetrating the board 520, and the fixing portion 820 may further include a protrusion penetrating the hook hole 822c and the board hole 529.

The protrusion 824 includes a protrusion base 824a extending from another side of the support portion 810, and a protrusion tip portion 824b disposed at an opposite side of the support portion 810 with respect to the protrusion base 824a, and an outer diameter of the protrusion base 824a may be formed smaller than or equal to an inner diameter of the board hole 529 and an inner diameter of the hook hole 822c, the protrusion tip portion 824b may be formed such that an outer diameter thereof decreases away from the support portion 810 along an extending direction of the protrusion 824, and a maximum outer diameter of the protrusion tip portion 824b may be formed greater than the inner diameter of the board hole 529 and the inner diameter of the hook hole 822c.

Here, the fixing member 800 may be formed of a plastic resin so that the hook tip portion 822b is capable of swinging with respect to the hook base 822a, the protrusion tip portion 824b passes through the board hole 529 and the hook hole 822c, and there is no electric influence between the board 520 and the interlock wire 740.

In addition, the board 520, the interlock wire 740, and the fixing member 800 may be assembled with one another as below.

That is, the fixing member 800 may be assembled into the board 520 before the board 520 is assembled into the electric compressor. In more detail, the fixing member 800 in a state illustrated in FIG. 5 allows the protrusion 824 to be inserted into the board hole 529 to be temporarily fastened to the board 520. At this instance, the support portion 810 may be in contact with the board upper surface 524, the hook base 822a may be in contact with the board outer circumferential surface 526, and the hook tip portion 822b may be spaced apart from the board lower surface 522. In addition, the hook tip portion 822b may be swung with respect to the hook base 822a to be in contact with the board lower surface 522, and the protrusion 824 which penetrates the board hole 529 may be inserted into the hook hole 822c.

Next, when the board 520 is assembled into the electric compressor, the interlock wire 740 is made to pass the board groove 528 before the board groove 528 is hidden by the inverter housing 18 and the board 520 is sufficiently inserted into the inverter accommodating space, and the power terminal 720 is inserted into the socket 540 of the board 520 as described above, then, the first interlock connector 744 may be fastened to the second interlock connector 560.

Next, in a state in which the interlock wire 740 is seated on the buckle 812, the belt 814 is inserted into the buckle hole 812a while covering the interlock wire 740, thereby the interlock wire 740 can be fixed to the support portion 810.

Here, as illustrated in FIG. 6, the belt 814 may include a bent portion 814b bent along an outer circumferential surface of the interlock wire 740. Therefore, the interlock wire 740 is supported on the buckle 812, and is supported on portions 814a and 814c positioned at opposite sides to each other with respect to the bent portion 814b, thereby the belt 814 can be supported by a three-point support.

In addition, as illustrated in FIG. 8, on a flat plane of the board upper surface 524, when a direction extending toward a projection position of the second interlock connector 560 from a projection position of the high voltage connector 62 is a first direction D1, and a direction in which the first interlock connector 744 is fastened to the second interlock connector 560 is a second direction D2, the second interlock connector 560 may be mounted in the board 520 such that a smaller angle θ among angles between the first direction D1 and the second direction D2 is smaller than or equal to 90 degrees with respect to the second interlock connector 560.

Accordingly, the interlock wire 740 may be relatively less bent. With this configuration, damage caused by bending of the interlock wire 740 can be suppressed, and a length increase due to bending of the interlock wire 740 can be suppressed, thereby the likelihood of damage to the interlock wire 740 due to a surrounding structure while the interlock wire 740 is vibrated can be reduced.

In addition, as the fixing member 800 configured to fix the interlock wire 740 to the board 520 is provided, the likelihood of damage to the interlock wire 740 due to a surrounding structure while the interlock wire 740 is vibrated can be further reduced.

Furthermore, by reducing a length of the interlock wire 740 and providing the fixing member 800, damage to the interlock wire 740 due to vibration of the interlock wire 740 can be prevented to an extent in which the cost, the size, and the weight of the electric compressor are not dramatically increased.

Here, the fixing member 800 includes the protrusion 824 and the hook 822, thus the fixing member 800 can be dually fixed to the board 520.

In addition, as the protrusion 824 is formed to be fastened to the hook 822 in a state in which the protrusion 824 passes through the board 520 and the hook 822, that is, the protrusion tip portion 824b has an outer diameter greater than an inner diameter of the board hole 529 and an inner diameter of the hook hole 822c so that the protrusion tip portion 824b penetrates the board hole 529 and the hook hole 822c and is caught by the hook hole 822c, the fixing member 800 can be stably fixed to the board 520, and separation of the fixing member 800 from the board 520 can be suppressed.

Moreover, as the protrusion tip portion 824b is formed such that an outer diameter thereof decreases away from the support portion 810 along an extending direction of the protrusion 824, and as the fixing member 800 is formed of a plastic resin which is deformable and restorable, the protrusion tip portion 824b may easily pass through the board hole 529 and the hook hole 822c, thereby the assembling efficiency can be improved.

Furthermore, as the fixing member 800 is formed of an electric insulation material such as a plastic resin, the current leakage can be prevented even if the coating 746 of the interlock wire 740 is damaged.

Also, as the fixing member 800 can be prevented from being rotated with respect to the board 520 because the hook base 822a is in contact with the board outer circumferential surface 526. Therefore, when the fixing member 800 is rotated by the vibration, bending of the interlock wire 740 due to a force delivered from the fixing member 800 can be prevented. In addition, as illustrated in FIGS. 7 and 8, as the fixing member 800 prevents the interlock wire 740, which is bent due to fastening between the first interlock connector 744 and the second interlock connector 560, from being unfolded, thereby unfastening between the first interlock connector 744 and the second interlock connector 560 because of a tension of the interlock wire 740 can be prevented.

At this instance, in terms of suppressing the damage due to bending of the interlock wire 740, it is preferable that the fixing member 800 and the second interlock connector 560 are formed such that a distance D from a center of the second interlock connector 560 to a center of the fixing member 800 is equal to or greater than 2.5 times a width W of the second interlock connector 560 measured in a direction perpendicular to a direction in which the first interlock connector 744 is fastened to the second interlock connector 560.

REFERENCE NUMERALS

20: motor
40: compression mechanism
50: inverter
60: connector
520: board
522: board lower surface
524: board upper surface
526: board outer circumferential surface
528: board groove
529: board hole
560: second interlock connector
720: power terminal
740: interlock wire
744: first interlock connector
800: fixing member
810: support portion
812a: buckle hole
812: buckle
814: belt
820: fixing portion
822: hook
822a: hook base

822b: hook base portion
822c: hook hole
824: protrusion
824a: protrusion base
824b: protrusion tip portion
D: a distance D from a center of a second interlock connector to a center of a fixing member
D1: first direction
D2: second direction
W: a width of a second interlock connector

What is claimed is:

1. An electric compressor, comprising:
a motor configured to generate power;
a compression mechanism configured to compress a refrigerant by receiving power from the motor;
an inverter configured to control the motor;
a connector connected to an external device;
a power terminal extending from the connecter to the inverter to deliver power supplied from the external device to the inverter; and
an interlock wire extending from the connector to the inverter to deliver a signal to the inverter when the connecter is detached from the external device, further comprising a fixing member fixed to a board of the inverter while supporting the interlock wire.

2. The electric compressor of claim 1, wherein the fixing member includes a support portion supporting the interlock wire and a fixing portion fixing the support portion to the board.

3. The electric compressor of claim 2, wherein the fixing portion includes a hook covering an outer circumferential portion of the board.

4. The electric compressor of claim 3, wherein the hook includes a hook base extending from the support portion and a hook tip portion extending from the hook base toward an opposite side of the support portion with respect to the board.

5. The electric compressor of claim 4, wherein the board includes a board lower surface facing the connector, a board upper surface forming a rear surface of the board lower surface, and a board outer circumferential surface extending from an outer circumferential portion of the board lower surface to an outer circumferential portion of the board upper surface, and wherein the support portion is in contact with the board upper surface, the hook base is in contact with the board outer circumferential surface, and the hook tip portion is in contact with the board lower surface.

6. The electric compressor of claim 4, wherein the hook tip portion is formed swingable with respect to the hook base.

7. The electric compressor of claim 4, wherein the hook tip portion includes a hook hole penetrated by the hook tip portion, wherein the board includes a board hole penetrating the board, and wherein the fixing portion further includes a protrusion penetrating the hook hole and the board hole.

8. The electric compressor of claim 7, wherein the protrusion includes a protrusion base extending from the support portion and a protrusion tip portion disposed on an opposite side of the support portion with respect to the protrusion base, wherein an outer diameter of the protrusion base is equal to or smaller than an inner diameter of the board hole and an inner diameter of the hook hole, wherein the protrusion tip portion has an outer diameter decreasing away from the support portion along an extending direction of the protrusion, and wherein a maximum outer diameter of the protrusion tip portion is formed greater than the inner diameter of the board hole and the inner diameter of the hook hole.

9. The electric compressor of claim 2, wherein the support portion protrudes from a surface connected to the interlock wire of the board and is formed to cover the interlock wire.

10. The electric compressor of claim 2, wherein the support portion includes a buckle having a buckle hole and a belt extending from the buckle and inserted into the buckle hole, and wherein the belt is inserted into the buckle hole while covering the interlock wire in a state in which the interlock wire is seated on the buckle, and the interlock wire is supported by the support portion.

11. The electric compressor of claim 1, wherein the connector is disposed on a first side of the board and the interlock wire is connected to a second opposite side from the first side of the board.

12. The electric compressor of claim 11, wherein the interlock wire includes a conductive wire formed of a conductive material, a first interlock connector connected to an end of the conductive wire, and a coating covering the conductive wire, and wherein a second interlock connector fastened to the first interlock connector is mounted in the board, and the second interlock connector is mounted in the board at a position not facing the connector.

13. The electric compressor of claim 12, wherein the board includes a board lower surface facing the connector, a board upper surface forming a rear surface of the board lower surface, a board outer circumferential surface extending from an outer circumferential portion of the board lower surface to an outer circumferential portion of the board upper surface, and a board groove formed recessed on the board outer circumferential surface, and wherein the second interlock connector is mounted on the board upper surface, and the interlock wire penetrates the board through the board groove and extends from the connector to the second interlock connector.

14. The electric compressor of claim 13, wherein the second interlock connector is mounted in the board outer circumferential portion.

* * * * *